W. B. LEFLER.
DRIVE MECHANISM FOR VEHICLES.
APPLICATION FILED AUG. 23, 1920.
1,388,869.
Patented Aug. 30, 1921.
2 SHEETS—SHEET 2.
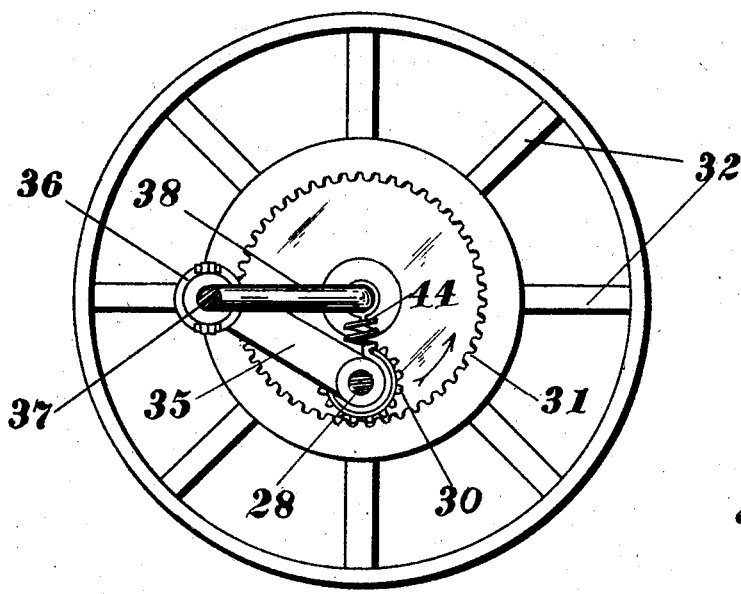
Fig. 3.
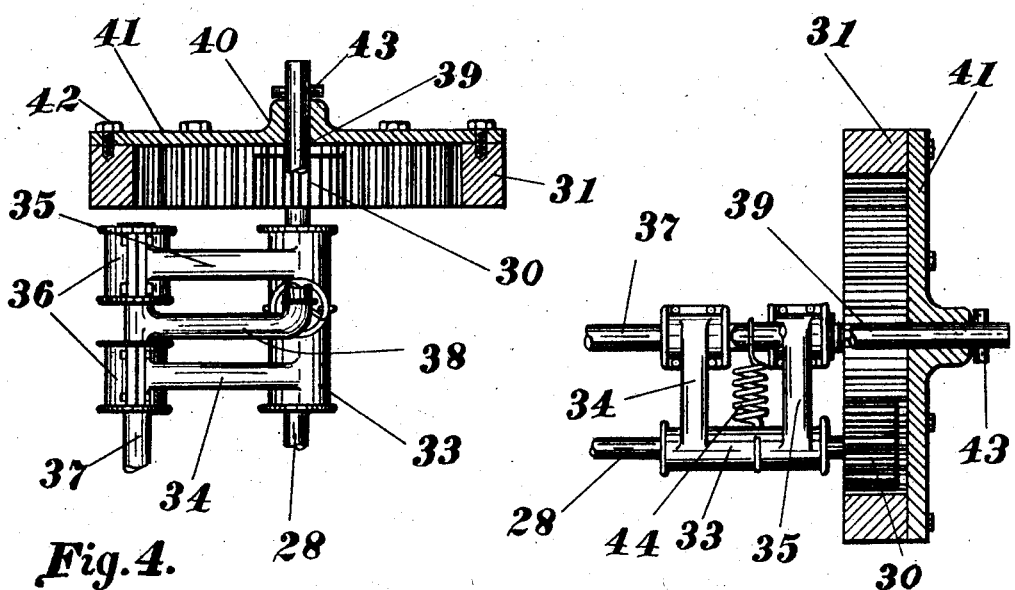
Fig. 4.
Fig. 5.
Inventor
W. B. Lefler.
By Arthur H. Sturges.
Attorney

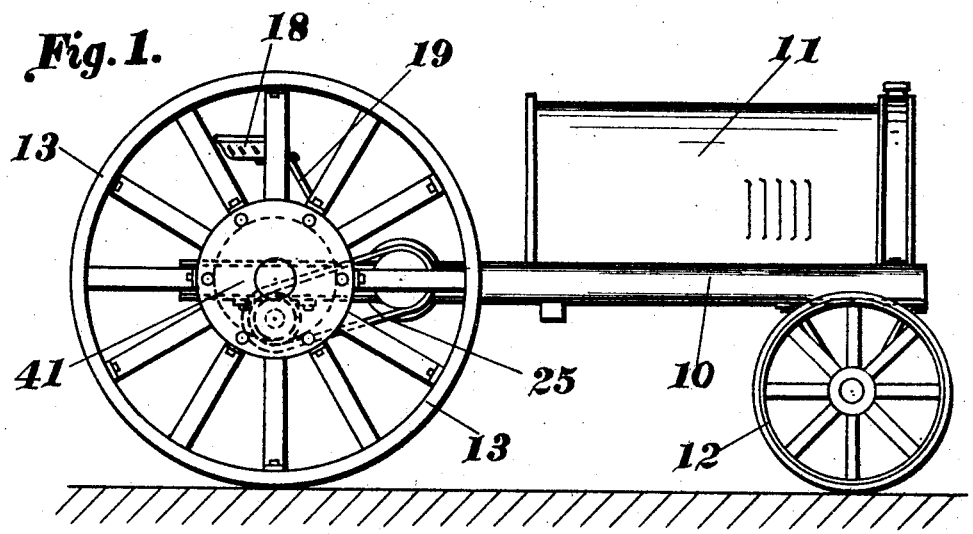
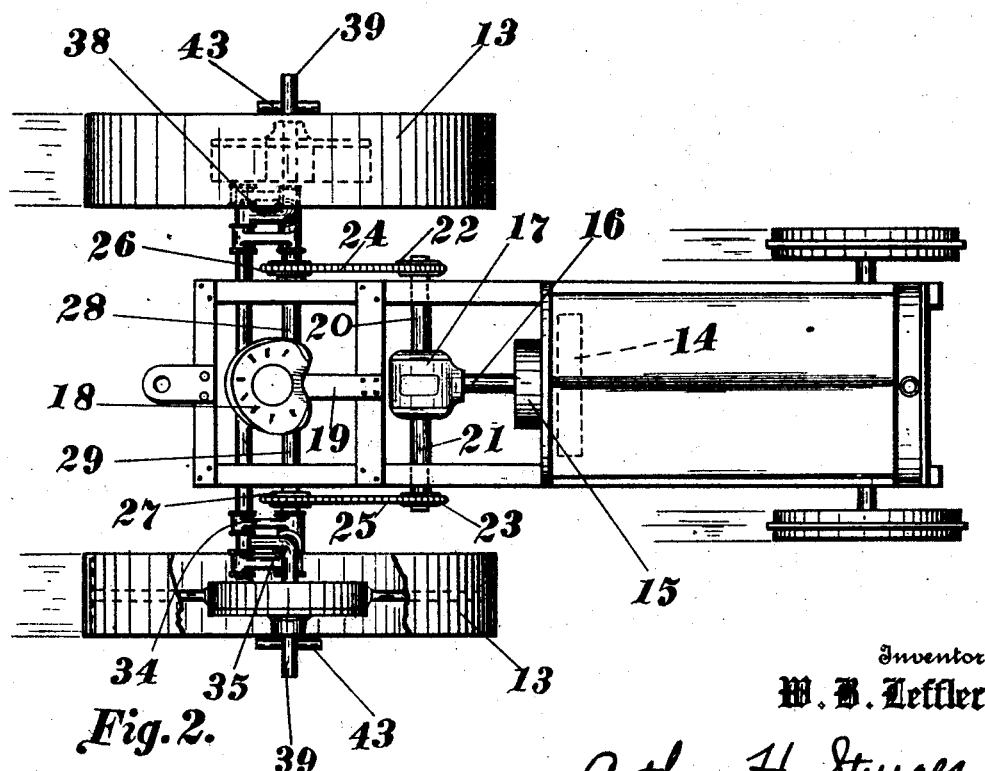

UNITED STATES PATENT OFFICE.

WILLIAM B. LEFLER, OF SPRINGFIELD, NEBRASKA.

DRIVE MECHANISM FOR VEHICLES.

1,388,869.     Specification of Letters Patent.     Patented Aug. 30, 1921.

Application filed August 23, 1920. Serial No. 405,403.

*To all whom it may concern:*

Be it known that I, WILLIAM B. LEFLER, a citizen of the United States, residing at Springfield, in the county of Sarpy and State of Nebraska, have invented certain new and useful Improvements in Drive Mechanism for Vehicles, of which the following is a specification.

The present invention relates to improvements in drive mechanism for vehicles and has for an object to provide an improved mechanism in which the weight of the vehicle will be taken advantage of in turning the traction wheels when inequalities in the road surface are encountered.

It is another object of the invention to produce more efficient traction, especially when obstacles are met with which would ordinarily tend to reduce the traction and make it more difficult for the vehicle to pass such obstructions.

A further object of the invention is to produce a simple and effective arrangement for the driving of motor vehicles, tractors, and the like in which the weight of the vehicle will be shifted whenever obstacles or inequalities are met with by the rear wheels so that such weight may assist in the propulsion of the wheels.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a view in elevation of a vehicle with the improved drive mechanism applied thereto;

Fig. 2 is a top plan view thereof with certain parts broken away;

Fig. 3 is a view of one of the traction wheels with the drive mechanism shown particularly in section;

Fig. 4 is a horizontal view through one of the wheels with fragmentary parts of the drive mechanism shown in connection therewith; and Fig. 5 is a vertical view through one of the wheels with the mechanism also shown partially in connection therewith.

Referring more particularly to the drawings, 10 designates a vehicle driven by a suitable motor beneath the hood 11 and being mounted for movement upon the front steering wheels 12 and the rear traction wheels 13. A fly-wheel 14 is employed in conjunction with the motor as is also a clutch 15 and a crank shaft 16 which latter extends to the differential 17.

A driver's seat 18 may be carried by the usual spring support 19. Extending with their inner ends entering the differential housing 17 are a pair of jack shafts 20 and 21 provided with sprockets 22 and 23 on their outer ends over which run chains 24 and 25. The opposite ends of the chains engage with similar sprockets 26 and 27 on drive shafts 28 and 29 which are supported in suitable bearings and which directly receive the weight of the frame 10.

As shown more particularly in Fig. 3, the shafts 28 and 29 each carry a pinion 30 placed in mesh with an internal ring gear 31 affixed in any suitable manner to the spokes or other parts 32 of the traction wheel 13. The pinions 30 are fixed on the shafts 28 and 29 so as to turn therewith when the clutch 15 is engaged.

A sleeve 33 loosely engages about the shaft 28 near the ring gear 31 and carries a pair of arms 34 and 35 which have two-part bearing boxes 36. These bearing boxes engage loosely about the end of a shaft or rod 37 which carries near each end thereof an arm 38 extending substantially parallel with the direction of movement of the vehicle. This latter arm 38 provides a means to carry at its free end the shaft 39 on which the traction wheel 13 is mounted.

As shown more particularly in Fig. 4, the shaft 39 passes through a bearing boss 40 cast with a cover plate 41 which is secured as by screws or bolts 42 to the exterior side of the ring gear 41. In this manner foreign matter is excluded from the internal working parts. The shaft 39 may with advantage be bent from the arm 38, which latter arm extends at an acute angle to the arms 34 and 35 and substantially midway between the latter.

A cross pin 43 is passed through the outer end of the shaft 39 in order to hold the wheel 13 in place. A coil spring 44 is arranged between the shaft 39 and the sleeve 33 and is normally in a loose condition acting neither to expand nor contract.

In use, the engine beneath the hood 11 acting through the crank shaft 16 and differential 17 will independently drive the two jack shafts 20 and 21 so that power is individually applied to the two drive shafts 28 and 29. These latter shafts 28 and 29 receive the weight of the vehicle body which thereupon presses the pinions 30 very effectively into the internal ring gears 31 by which the rear drive wheels 13 are put into motion.

Should inequalities or obstacles be encountered in the road very materially resisting the turning movement of the rear wheels, then the pinions 30 will tend to climb in the ring gears 31 in the direction of the arrow in Fig. 3 so that the weight of the vehicle, instead of being normally carried at the base of the ring gear and in vertical alinement with the wheel axles 39 will be transferred to a point forward and upward of the normal position.

The weight of the vehicle body acting in this new position will have a tendency to rotate the rear wheels, and this tendency will be in addition to that received from the engine in the customary way. Consequently, whenever the rear wheels resist turning movement by reason of some exterior resistance, the turning moment devolving upon the same will be increased by the shifting of the weight of the vehicle to the new position just referred to. This new position will be largely governed by the amount of the resistance, so that a proportionate degree of power will be added.

The spring 44 will, of course, expand and contract under changes of the character just mentioned and will have a compensating effect on these parts together with a further function of serving to restore the parts to the normal initial position.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. In combination with a vehicle having a self-contained power plant, a differential on the vehicle in connection with the power plant, jack shafts journaled in the vehicle and connecting individually with said differential, drive shafts directly supporting the weight at the rear of the vehicle and connected to be individually driven from said jack shafts, pinions on the ends of said drive shafts, traction wheels for the vehicles, internal gears fixed to said traction wheels and engaging with said pinions, sleeves rotatably fitting said drive shafts, arms extending from said sleeves, a rod turning in said arms, and axles extending from said rod on which the traction wheels are fitted to rotate.

2. In combination with a vehicle having a self-contained power plant, a differential on the vehicle in connection with the power plant, jack shafts journaled in the vehicle and connected to said differential, drive shafts supporting the weight of the vehicle at one end, means connecting said drive shaft with said jack shafts, pinions on the drive shafts, traction wheels in the vehicle having their axes of rotation eccentric to said drive shafts, internal gears carried by said traction wheels and placed in mesh with said pinions, sleeves rotatably fitted upon said drive shafts, arms extending from said sleeves, a rod carried by and turning in said arms, axles carried by said rod on which the traction wheels are mounted to rotate, and resilient means interposed between said axles and sleeves.

3. In combination with a vehicle having a self-contained power plant, a differential on the vehicle in connection with the power plant, jack shafts transversely mounted in the vehicle and individually connected to said differential, drive shafts also journaled transversely in the vehicle and supporting the weight thereof, said drive shafts being in rear of said jack shafts, chain connections between said drive and jack shafts, pinions on the outer ends of said drive shafts, traction wheels for the vehicle having their centers of rotation eccentric to said drive shafts, internal gears fixed to said traction wheels and in mesh with said pinions, sleeves on said drive shafts turning loosely thereon, pairs of arms extending rearwardly and upwardly from said sleeves and having their forward lower ends affixed to the sleeves, said rear upper ends of the arms provided with bearings, a rod journaled to turn in said bearings, axles extending forwardly from said rod between said bearings, and having rod angled extensions projecting through the hubs of the traction wheels, and coil springs connected between said axles and sleeves.

In testimony whereof, I have affixed my signature in presence of two witnesses.

WILLIAM B. LEFLER.

Witnesses:
 E. N. CHRISTIANSON,
 N. J. CHRISTIANSON.